US012520887B2

(12) United States Patent
Lin

(10) Patent No.: US 12,520,887 B2
(45) Date of Patent: Jan. 13, 2026

(54) MULTIFUNCTIONAL PROTECTIVE ISOLATION MASK

(71) Applicant: Weifeng Lin, Haikou (CN)

(72) Inventor: Weifeng Lin, Haikou (CN)

( * ) Notice: Subject to any disclaimer, the term of this patent is extended or adjusted under 35 U.S.C. 154(b) by 731 days.

(21) Appl. No.: 17/954,192

(22) Filed: Sep. 27, 2022

(65) Prior Publication Data

US 2023/0014317 A1 Jan. 19, 2023

Related U.S. Application Data

(63) Continuation of application No. PCT/CN2020/089990, filed on May 13, 2020.

(30) Foreign Application Priority Data

Apr. 27, 2020 (CN) .......................... 202020671882.5

(51) Int. Cl.
*A41D 13/11* (2006.01)
*G01J 5/00* (2022.01)
*G01K 1/14* (2021.01)

(52) U.S. Cl.
CPC ................ *A41D 13/11* (2013.01); *G01J 5/00* (2013.01); *G01K 1/14* (2013.01)

(58) Field of Classification Search
CPC ...... A41D 13/11–1192; A62B 7/00–14; A62B 9/00–04; A62B 18/00–10; A62B 23/00–04; G01J 5/00; G01K 1/14
See application file for complete search history.

(56) References Cited

U.S. PATENT DOCUMENTS

| | | | | |
|---|---|---|---|---|
| 4,293,757 A | * | 10/1981 | Niemi ..................... | A61F 9/068 2/8.6 |
| 4,793,343 A | * | 12/1988 | Cummins, Jr ......... | A62B 18/08 219/501 |
| 5,372,130 A | * | 12/1994 | Stern .................... | A62B 18/006 128/206.17 |
| 5,666,664 A | * | 9/1997 | Hamilton ............... | G02C 11/00 2/9 |

(Continued)

FOREIGN PATENT DOCUMENTS

| | | |
|---|---|---|
| CN | 202740663 U | 2/2013 |
| CN | 104814544 A | 8/2015 |

(Continued)

*Primary Examiner* — Michelle J Lee
(74) *Attorney, Agent, or Firm* — JEEN IP LAW, LLC

(57) ABSTRACT

A multifunctional protective isolation mask is provided, comprising a mask main body (1) and a wearing monitoring mechanism. The wearing monitoring mechanism comprises a temperature sensor (4), a controller (5), a display screen (6) and a first press button (7). After a user wears the mask, the temperature sensor (4) collects corresponding temperature information and transmits the temperature information to the controller (5), and at the same time, the first press button (7) is pressed and transmits an electric signal to the controller (5); when the controller (5) determines that the temperature information belongs to the human body temperature range and receives the electric signal sent by the first press button (7), it is determined that the user is wearing the mask, and the wearing time is thus recorded, and after the user takes off the mask, the first press button (7) resets.

8 Claims, 6 Drawing Sheets

(56) References Cited

U.S. PATENT DOCUMENTS

| | | | | |
|---|---|---|---|---|
| 2002/0062830 | A1* | 5/2002 | Meier | A62B 18/006 |
| | | | | 128/204.21 |
| 2012/0152253 | A1* | 6/2012 | Leuschner | A62B 18/02 |
| | | | | 128/204.26 |
| 2018/0036562 | A1* | 2/2018 | Patel | A62B 9/006 |
| 2018/0078798 | A1* | 3/2018 | Fabian | A62B 18/10 |
| 2020/0038614 | A1* | 2/2020 | Duff | A61M 16/107 |
| 2021/0086005 | A1* | 3/2021 | O'Brien | A61P 19/00 |
| 2021/0228920 | A1* | 7/2021 | Arigue | A62B 18/025 |

FOREIGN PATENT DOCUMENTS

| | | |
|---|---|---|
| CN | 205456234 U | 8/2016 |
| CN | 107713147 A | 2/2018 |
| CN | 108458841 A | 8/2018 |
| CN | 207804744 U | 9/2018 |
| CN | 208372258 U | 1/2019 |
| CN | 109393606 A | 3/2019 |
| CN | 209548500 U | 10/2019 |
| CN | 210250829 U | 4/2020 |
| CN | 210355727 U | 4/2020 |
| DE | 19808105 A1 | 9/1999 |

* cited by examiner

MULTIFUNCTIONAL PROTECTIVE ISOLATION MASK

CROSS-REFERENCE TO RELATED APPLICATIONS

The application claims priority to Chinese patent application No. 202020671882.5, filed on Apr. 27, 2020, the entire contents of which are incorporated herein by reference.

TECHNICAL FIELD

The present disclosure relates to the technical field of protection, in particular to a multifunctional protective isolation mask.

BACKGROUND

A mask is a protective device to protect faces of people. Masks have different designs when applied to different fields. A medical mask is a common type of masks worn by medical staff or patients to prevent the spread of bacteria and viruses, which plays a role in isolation and protection. In 2019, novel coronavirus broke out. Masks and gauze masks become necessary devices to block the spread of viruses. Some close contacts of diagnosed patients need to be isolated and wear protective masks at the same time. However, the existing masks cannot judge wearing time of users, so as not to ensure whether isolators consciously abide by the wearing of masks.

SUMMARY

In view of this, the present disclosure provides a multifunctional protective isolation mask, which can automatically judge and display the time when the isolators wear the mask, thus preventing the spread of epidemic situations caused by the unconsciousness of isolators.

The technical solution of the present disclosure is realized as follows.

A multifunctional protective isolation mask is provided, comprising a mask main body and a wearing monitoring mechanism, wherein the mask main body comprises a human face contact surface and an external contact surface, the wearing monitoring mechanism is provided on the mask main body; the wearing monitoring mechanism comprises a temperature sensor, a controller, a display screen and a first press button, the temperature sensor and the first press button are provided inside the mask main body and are close to the human face contact surface, the first press button is located at the edge of the mask main body, the display screen is provided on the outer surface of the external contact surface; the external contact surface is provided with an oxygen pipe connection ports and the oxygen pipe connection port is communicated with the inside of the mask main body; the controller is provided inside the mask main body and is electrically connected with the display screen, the temperature sensor and the first press button, respectively.

Preferably, the mask main body further comprises air inlet channels, an air outlet channel and motors, the air inlet channels and the air outlet channel are communicated with the external contact surface and the human face contact surface, and the motors are respectively disposed in the air inlet channels and the air outlet channel and are electrically connected with the controller.

Preferably, the mask main body further comprises filter assemblies, and the filter assemblies are respectively detachably provided on the air inlet channels and the air outlet channel.

Preferably, the filter assemblies comprise connecting pipes, filter cotton sheets, pipe bodies, and perforated plates. The filter assemblies disposed on the air inlet channels further comprise air regulating plates provided at the air inlet channels of the human face contact surface. The connecting pipes are respectively connected at the air inlet channel and the air outlet channel of the external contact surface. An outer surface of each of the connecting pipes is provided with external threads, an inner surface of a first end of each of the pipe bodies is provided with internal threads, a second end of each of the pipe bodies is provided with a corresponding one of the perforated plates, each of the filter cotton sheets is provided at a corresponding one of the connecting pipes, and each of the pipe bodies is screwed with a corresponding one of the connecting pipes to fix an edge of a corresponding one of the filter cotton sheets.

Preferably, the multifunctional protective isolation mask further comprises a pickup, a horn, an adjustable LED lamp and a camera, wherein the pickup is provided on the human face contact surface, the horn, the adjustable LED lamp and the camera are provided on the external contact surface, and the controller is electrically connected with the pickup, the horn, the adjustable LED lamp and the camera, respectively.

Preferably, the multifunctional protective isolation mask further comprises an information transmission unit, wherein the information transmission unit is provided inside the mask main body and is electrically connected with the controller.

Preferably, the multifunctional protective isolation mask further comprises an air quality sensor, a positioning chip, a sim slot and a rotation speed sensor for detecting the rotation speed of each of the motors. The air quality sensor and the sim slot are provided on the human face contact surface, the positioning chip is provided inside the mask main body, and the controller is electrically connected with the air quality sensor, the rotation speed sensor, the positioning chip and the sim slot, respectively.

Preferably, the multifunctional protective isolation mask further comprises spectacle frames and spectacle leg fixing holes, wherein the spectacle frames are provided on both sides of the mask main body and form openings with a larger upper part and a smaller lower part together with the mask main body, and the spectacle leg fixing holes are provided inside both sides of the mask main body and are communicated with the human face contact surface and the external contact surface.

Preferably, the multifunctional protective isolation mask further comprises a window channel, wherein the window channel is communicated with the human face contact surface and the external contact surface, an opening and closing sheet is provided at the part where the window channel is communicated with the external contact surface, the opening and closing sheet opens and closes the window channel, the opening and closing sheet is provided with a second press button, and the controller is electrically connected with the second press button.

Preferably, the human face contact surface is provided with a baffle, a first buckle, a second buckle, an air outlet and a third press button. The third press button is provided in the second buckle. The baffle is located above the window channel and is hinged with the human face contact surface. The baffle is fixed by the first buckle when the baffle is in the vertical state and is fixed by the second buckle when the baffle is in the horizontal state. The controller is electrically connected with the third press button. The air outlet is communicated with the external contact surface, and the external contact surface is provided with a rotating air vent.

Preferably, the edge of the human face contact surface is provided with a silicone strip.

Preferably, the multifunctional protective isolation mask further comprises an elastic fixing belt, and both ends and the upper end of the elastic fixing belt are connected with both sides and the upper part of the mask main body, respectively.

Preferably, the multifunctional protective isolation mask further comprises a rechargeable battery and a charging interface, wherein the rechargeable battery is provided inside the mask main body and is electrically connected with the controller, the display screen and the temperature sensor, respectively, and the charging interface is provided above the mask main body and is electrically connected with the rechargeable battery.

Preferably, the multifunctional protective isolation mask further comprises a key panel, wherein the key panel is provided on the external contact surface and is electrically connected with the controller.

Compared with the prior art, the present disclosure has the following beneficial effects.

The present disclosure provides a multifunctional protective isolation mask. When a user wears the mask main body, the temperature sensor can detect the human body temperature and transmit the temperature information to the controller. The controller displays the temperature information on the display screen, which is convenient for others to check the temperature information. At the same time, after the user wears the mask, the first press button inside the mask main body is squeezed, and the first press button sends an electrical signal to the controller. When the controller receives the data transmitted by the first press button and the temperature sensor at the same time, it can be determined that the user wears the mask, so as to record the start time, the duration and the end time of wearing the mask, and display the corresponding information on the display screen. Other workers can check the wearing information of the user through the display screen to prevent the user from unconsciously wearing the mask.

BRIEF DESCRIPTION OF THE DRAWINGS

In order to explain the technical solution in the embodiment of the present disclosure more clearly, the drawings needed in the description of the embodiment will be briefly introduced hereinafter. Obviously, the drawings in the following description are merely the preferred embodiments of the present disclosure. For those skilled in the art, other drawings can be obtained according to these drawings without paying creative labor.

DETAILED DESCRIPTION OF THE EMBODIMENTS

In order to better understand the technical content of the present disclosure, a specific embodiment is provided hereinafter, and the present disclosure is further explained in conjunction with the attached drawings.

Figure 1:
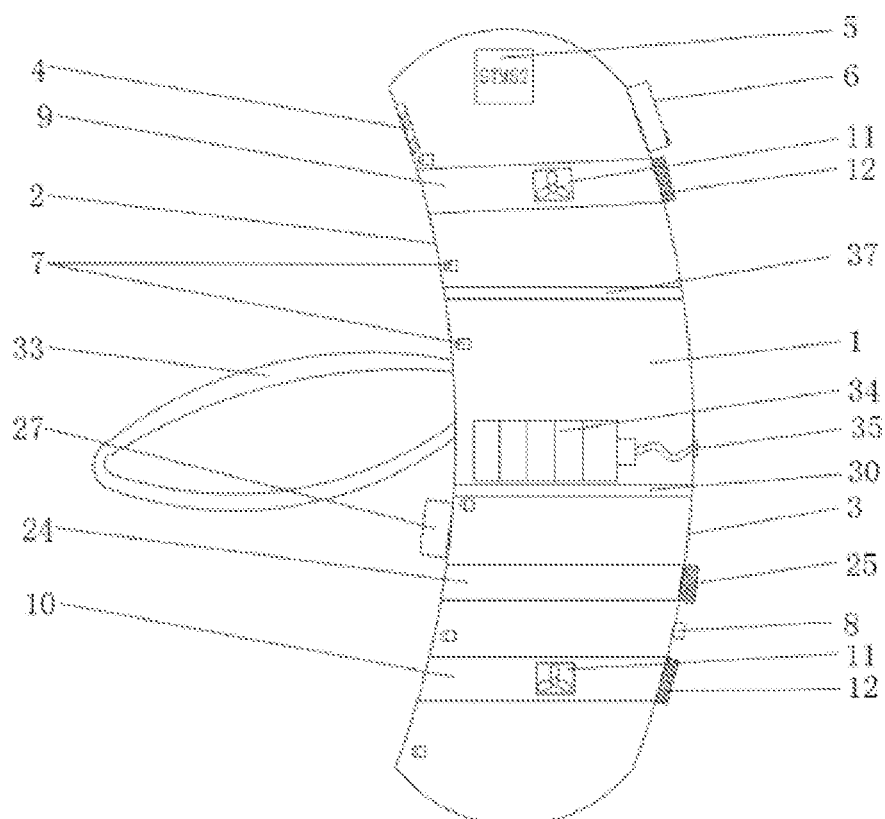
FIG. 1 is a structural schematic diagram of a multifunctional protective isolation mask according to the present disclosure.
Figure 2:
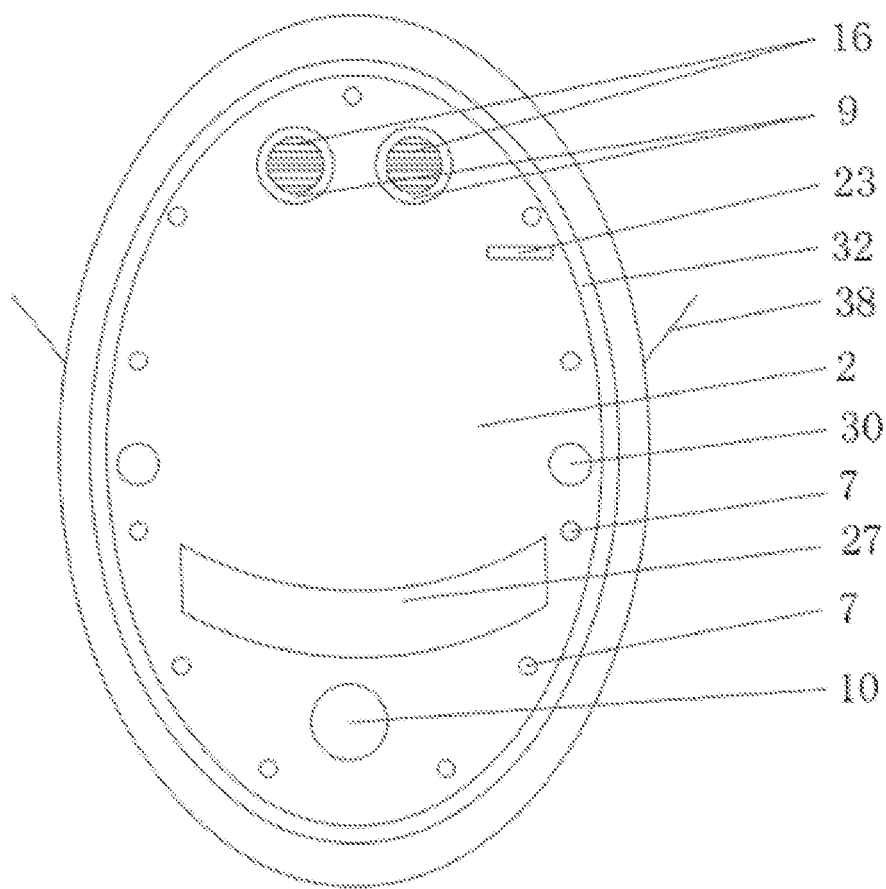
FIG. 2 is a structural schematic diagram of a human face contact surface of a multifunctional protective isolation mask according to the present disclosure.
Figure 3:
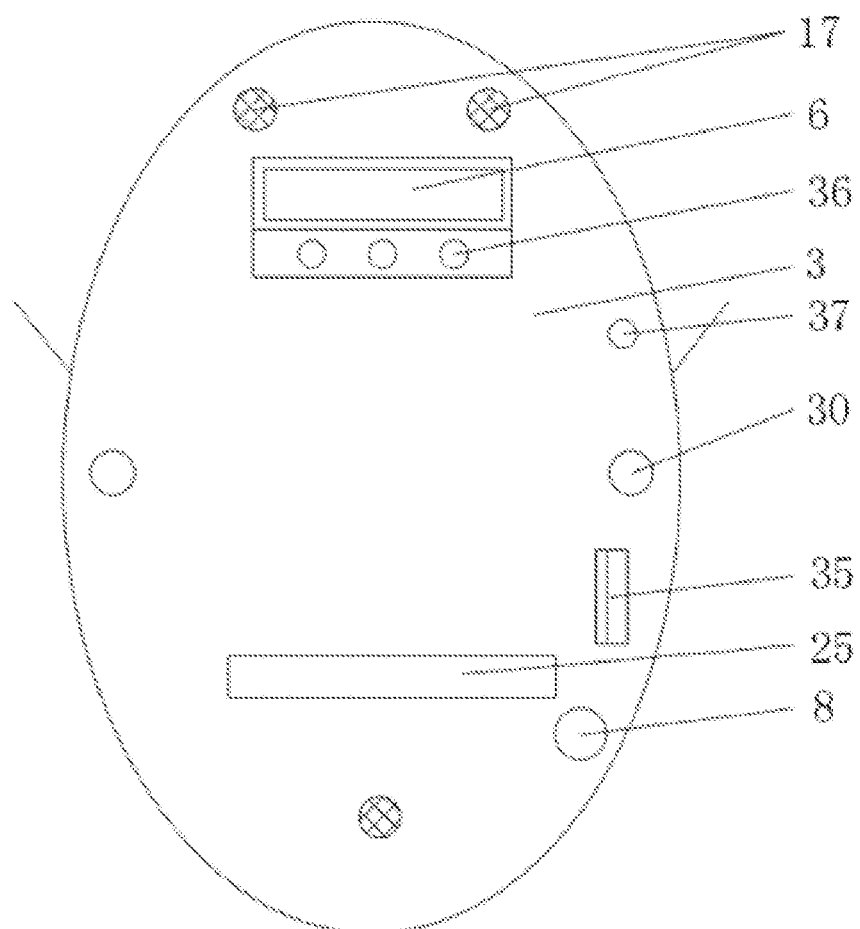
FIG. 3 is a structural schematic diagram of an external contact surface of a multifunctional protective isolation mask according to the present disclosure.
Figure 4:
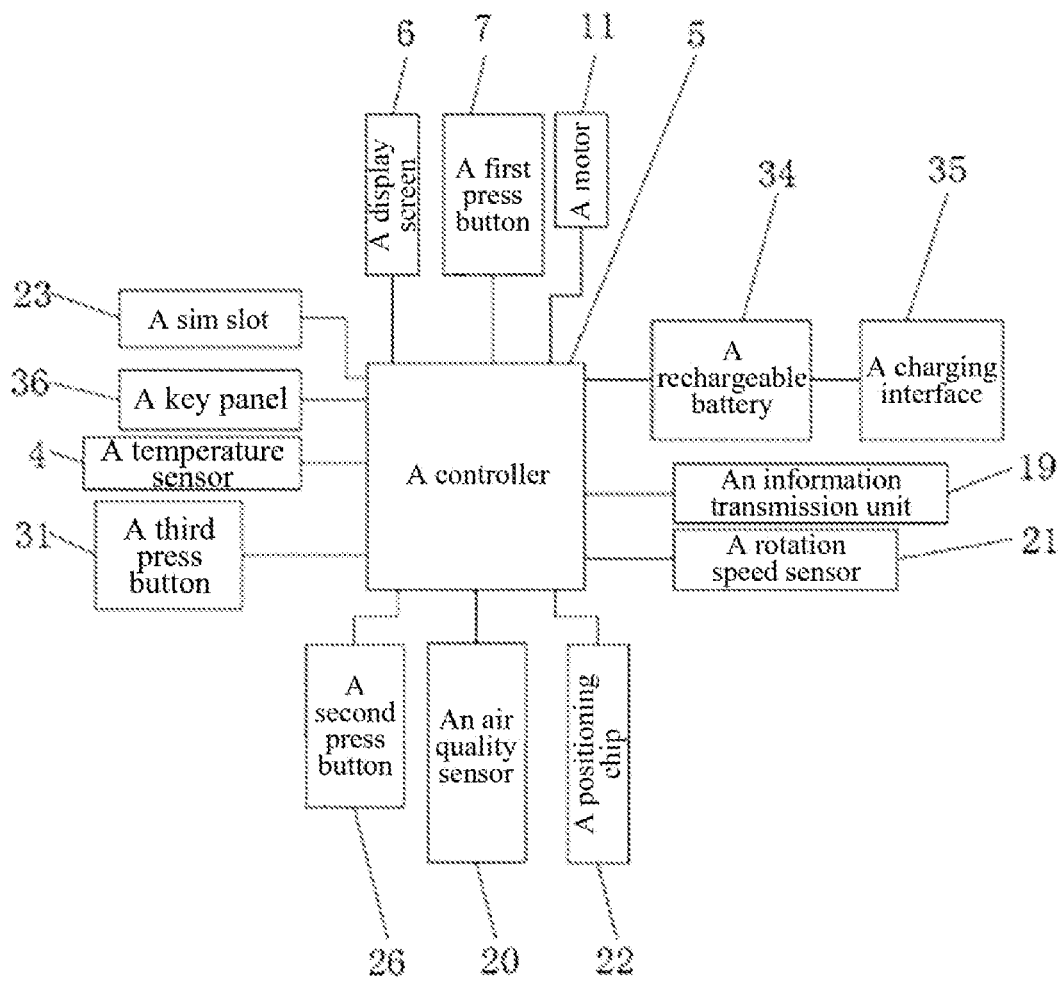
FIG. 4 is a circuit schematic diagram of a multifunctional protective isolation mask according to the present disclosure.
Figure 5:
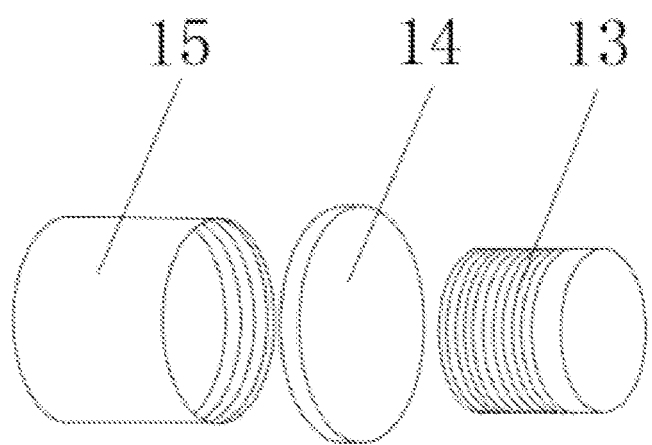
FIG. 5 is a structural schematic diagram of filter assemblies at air inlet channels of a multifunctional protective isolation mask according to the present disclosure.
Figure 6:
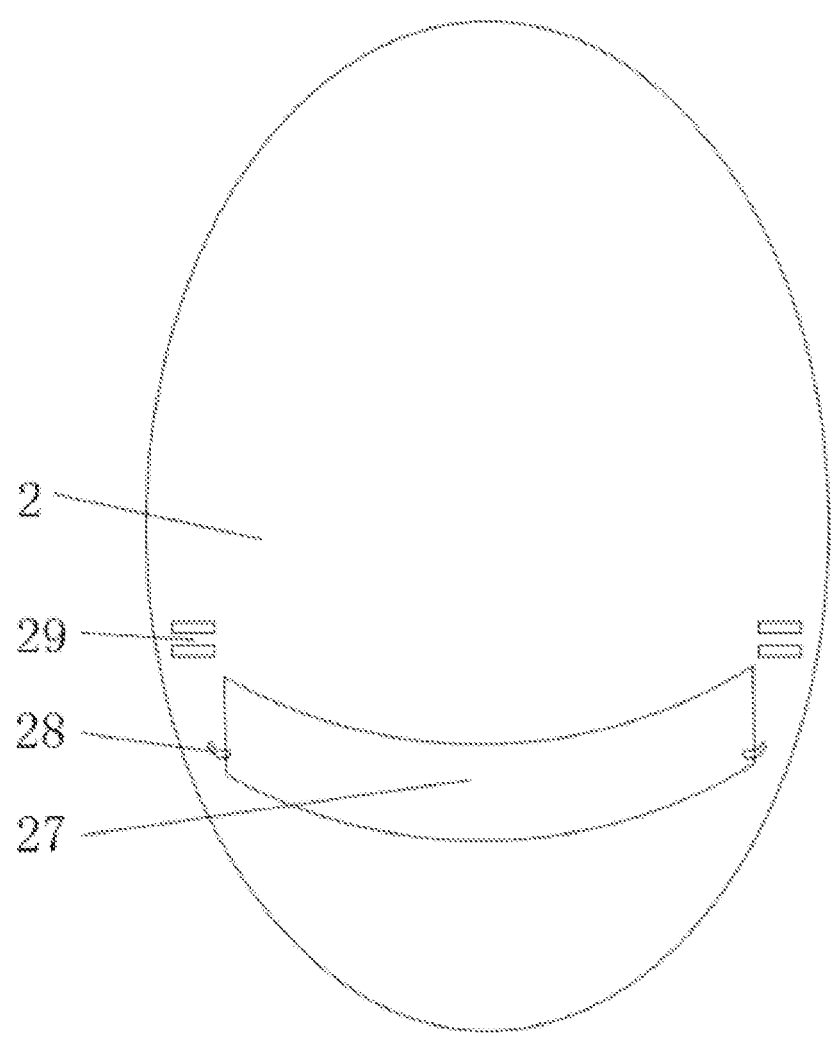
FIG. 6 is a schematic diagram of a connection structure between a baffle and a human face contact surface of a multifunctional protective isolation mask according to the present disclosure.

As shown in FIGS. 1 to 6, the present disclosure provides a multifunctional protective isolation mask, comprising a mask main body 1 and a wearing monitoring mechanism, wherein the mask main body 1 comprises a human face contact surface 2 and an external contact surface 3, the wearing monitoring mechanism is provided on the mask main body 1; the wearing monitoring mechanism comprises a temperature sensor 4, a controller 5, a display screen 6 and a first press button 7, the temperature sensor 4 and the first press button 7 are provided inside the mask main body 1 and are close to the human face contact surface 2, the first press button 7 is located at the edge of the mask main body 1, the display screen 6 is provided on the outer surface of the external contact surface 3; the external contact surface 3 is provided with an oxygen pipe connection port 8, and the oxygen pipe connection port 8 is communicated with the inside of the mask main body 1; the controller 5 is provided inside the mask main body 1 and is electrically connected with the display screen 6, the temperature sensor 4 and the first press button 7, respectively.

According to the multifunctional protective isolation mask of this embodiment, the mask main body 1 covers the whole face or a half face, and is made of an integrally formed transparent material. After the mask main body 1 is worn on the face of the user, the mask main body can play a role in blocking the spreading of external viruses. After the human face contact surface 2 of the mask main body 1 is in contact with the human face, viruses, bacteria, etc. can be isolated from the external contact surface 3 to prevent infection. In this embodiment, a temperature sensor 4 is provided inside the human face contact surface 2, and the temperature sensor 4 is located at the forehead height. After the user wears the mask, the temperature sensor 4 can collect the temperature information and transmit the temperature information to the controller 5. The controller 5 displays the temperature information on the display screen 6 after processing the temperature information, so that other workers can check the temperature information at any time.

In addition, the present disclosure further provides a wearing monitoring mechanism. The wearing monitoring mechanism comprises dual monitoring, in which the first monitoring is the temperature sensor 4, and the second monitoring is the first press button 7. The first press button 7 is provided inside the edge of the human face contact surface 2. When the mask is worn, the first press button 7 is squeezed, and the temperature sensor 4 collects temperature information at the same time. Both the first press button 7 and the temperature sensor 4 transmit electrical signals to the controller 5. When the controller 5 receives the electric signals transmitted by the first press button 7 and the temperature sensor 4 at the same time, it is determined that the user has worn the mask, and the wearing time of the mask is recorded. After the user takes off the mask, the first press button 7 resets. When the temperature information collected by the temperature sensor 4 does not reach the body temperature range, the controller 5 determines that the mask has been taken off, the taking-off time of the mask is recorded, meanwhile, the wearing duration of the mask is calculated, and then the corresponding time information is displayed on the display screen 6, so as to check the duration that the user wears the mask and the time when the user starts to wear the mask.

The present disclosure further provides an oxygen pipe connection port 8. When not in use, the oxygen pipe connection port 8 is sealed by a sealing cap (not shown in the figure) in a buckling connection or screwing connection manner, so that external air can be prevented from entering the mask main body 1. The oxygen pipe connection port can be used in hospitals, connected with the oxygen pipe, and convenient for critically ill patients to breathe. In order to ensure the accuracy of data, the controller 5 of the present disclosure is a single-chip microcomputer of an STM32F10R8 model. The model of the temperature sensor 4 is a DS18B20-class contact temperature sensor or an OTP-638D2-class non-contact infrared temperature sensor. Only when the temperature information collected by the temperature sensor 4 is within the body temperature range, can it be determined that the user wears a mask.

Preferably, the mask main body 1 further comprises air inlet channels 9, an air outlet channel 10, and motors 11, the air inlet channels 9 and the air outlet channel 10 are communicated with the external contact surface 3 and the human face contact surface 2, and the motors 11 are respectively provided in the air inlet channels 9 and the air outlet channel 10 and are electrically connected with the controller 5.

Specifically, the air inlet channels 9 are located above the air outlet channel 10, which can realize the circulating flow of air. The air inlet channels 9 are located near both sides of the forehead, and air can enter the mask from the upward side, so as to ensure to inhale fresh air every time. The motors 11 are respectively provided in the air inlet channels 9 and the air outlet channel 10. The motors 11 can control the speed of air flow, thus being suitable for some patients who cannot breathe on their own. The power size of each of the motors 11 is controlled by the controller 5 to control the speed of conveying air.

Preferably, the mask main body 1 further comprises filter assemblies 12, and the filter assemblies 12 are respectively detachably provided on the air inlet channels 9 and the air outlet channel 10. The filter assemblies comprise connecting pipes 13, filter cotton sheets 14, pipe bodies 15, and perforated plates 17. The air regulating plates 16 disposed on the air inlet channel further comprise air regulating plates 16 provided at the air inlet channels 9 of the human face contact surface. The connecting pipes 13 are respectively connected at the air inlet channels 9 and the air outlet channel 10 of the external contact surface 3. An outer surface of each of the connecting pipes 13 is provided with external threads, an inner surface of a first end of each of the pipe bodies 15 is provided with internal threads, a second end of each of the pipe bodies 15 is provided with a corresponding one of the perforated plates 17, each of the filter cotton sheets 14 is provided at a corresponding one of the connecting pipes 13, and each of the pipe bodies 15 is screwed with a corresponding one of the connecting pipes 13 to fix an edge of a corresponding one of the filter cotton sheets 14.

When a user wears a mask to breathe, two of the filter assemblies 12 provided at the air inlet channels 9 can filter out viruses and bacteria in air inhaled from the outside to prevent the user from being infected. Meanwhile, the air exhaled by the user will first pass through one of the filter assemblies 12 disposed on the air outlet channel 10 and then is blown out from the air outlet channel 10. When the user is infected with respiratory diseases, the virus and bacteria exhaled by the user can be filtered out to prevent the virus from spreading into the air and causing harm to others.

The filter assemblies 12 of the present disclosure are detachable. After a certain period of use, each of the filter cotton sheets 14 therein can be replaced. The number of filter cotton sheets 14 can be selected independently when in use. A diameter of each of the filter cotton sheets 14 is larger than that of each of the connecting pipes 13 and each of the pipe bodies 15. When in use, each of the filter cotton sheets 14 is first placed at the corresponding one of the connecting pipes 13, and then each of the pipe bodies 15 is screwed with the corresponding one of the connecting pipes 13, so that each of the pipe bodies 15 can press the corresponding one of the filter cotton sheets 14 tightly to fix the corresponding one of the filter cotton sheets 14. Each of the pipe bodies 15 has a hollow structure, and air can be conveyed from each of the filter cotton sheets 14.

The perforated plates 17 are used to prevent external large-particle impurities from entering the air inlet channels 9 or the air outlet channel 10, and the air regulating plates 16 provided at the air inlet channels 9 of the human face contact surface 2 can regulate the air direction of the air intake. The edge of each of the air regulating plates 16 is connected with the inner wall of a corresponding one of the air inlet channels 9. When the motors 11 pumps air, the flowing air will make the air regulating plates 16 rotate, and the air regulating plates 16 can regulate the air direction when rotating.

Preferably, the multifunctional protective isolation mask further comprises an information transmission unit 19, wherein the information transmission unit 19 is provided inside the mask main body 1 and is electrically connected with the controller 5.

The information transmission unit 19 can use wired transmission or wireless transmission. The wireless transmission includes but is not limited to Bluetooth, wifi and ZigBee units. The controller 5 can transmit the temperature information, mask wearing information, etc. through the information transmission unit 19. External remote monitoring can be realized after intelligent terminals such as mobile phones receive relevant information. At the same time, the wearer can send the corresponding control information to the controller 5 through a mobile phone APP, such as controlling the rotation speed of each of the motors 11, the volume of the horn, and the brightness of the adjustable LED, etc., which not only can realize the information interaction, but also realize the remote control function. The information transmission unit can be accessed to the database of the government or the hospital in the later stage, providing data support for the epidemic prevention work of the government and the hospital.

A corresponding two-dimensional code can be further provided on the external contact surface 3, and a monitor can scan the two-dimensional code to obtain temperature information, positioning information, mask wearing information and the like.

Preferably, the multifunctional protective isolation mask further comprises an air quality sensor 20, a positioning chip 22, a sim slot 23 and a rotation speed sensor 21 for detecting the rotation speed of each of the motors 11. The air quality sensor 20 and the sim slot 23 are provided on the human face contact surface 2. The positioning chip 22 is provided inside the mask main body 1, and the controller 5 is electrically connected with the air quality sensor, 20 the rotation speed sensor 21, the positioning chip 22 and the sim slot 23, respectively.

The air quality sensor 20 can comprise one or more of an oxygen concentration sensor, a PM2.5 sensor, a formaldehyde sensor and a sulfur dioxide sensor, which can be selected according to different application scenarios. Each of the motors 11 is provided with a rotation speed sensor 21 for detecting the working state of each of the motors 11. When the motor 11 in the air outlet channel goes wrong, the controller 5 can control the motor 11 of the air inlet channels to increase the power to ensure the normal breathing of users. At the same time, the controller 5 can also control the power size of the motors 11 according to the oxygen concentration, and realize feedback adjustment. The user can be positioned by the set positioning chip 22. The positioning chip 22 has a model of MAX-M8Q, or other GPS positioning chips 22 are possible.

Preferably, the multifunctional protective isolation mask further comprises a window channel 24. The window channel 24 is communicated with the human face contact surface 2 and the external contact surface 3. An opening and closing sheet 25 is provided at the part where the window channel 24 is communicated with the external contact surface 3. The opening and closing sheet 25 opens and closes the window channel 24. A sealing ring is provided at the opening and closing position. The opening and closing sheet 25 is provided with a second press button 26, and the controller 5 is electrically connected with the second press button 26.

The window channel 24 is provided, which is convenient for the user to eat without taking off the mask. After opening the opening and closing sheet 25, the mouth of the user can be communicated with the outside, so that the user can eat with chopsticks or spoons. One side of the opening and closing sheet 25 is hinged with the external contact surface 3 through hinges, and the other side thereof can be detachably connected by hook and loop fasteners or buckles. The second press button 26 provided on the opening and closing sheet 25 can record the time and duration of opening the opening and closing sheet 25, and the corresponding information is displayed on the display screen 6 by the controller 5.

Preferably, the human face contact surface 2 is provided with a baffle 27, a first buckle 28, a second buckle 29, an air outlet 30 and a third press button 31. The third press button 31 is provided in the second buckle 29. The baffle 27 is located above the window channel 24, is provided with a sealing ring, and is hinged with the human face contact surface 2. The baffle 27 is fixed by the first buckle 28 when the baffle is in the vertical state, and is fixed by the second buckle 29 when the baffle is in the horizontal state. The controller 5 is electrically connected with the third press button 31. The air outlet 30 is communicated with the external contact surface 3, and the external contact surface 3 is provided with a rotating air vent.

When a user eats, the baffle 27 needs to be pushed upward so that the baffle 27 is in the horizontal state. At this time, the end of the baffle 27 is in contact with the human face, so that a new closed space is formed above the baffle 27, and air can be discharged from the air outlet 30, which is equivalent to a half mask. The air outlet 30 is provided with the same filter assemblies 12 as the air outlet channel 10. The baffle 27 is fixed by the first buckle 28 and the second buckle 29 in the vertical state and the horizontal state, respectively. The second buckle 29 is provided with a third press button 31. When the baffle 27 rotates to the horizontal state and is in contact with the second buckle 29, the third press button 31 is triggered, so that the controller 5 receives corresponding information for calculating the time and duration of opening the baffle 27. The present disclosure further provides a memory for storing temperature information, mask opening and closing information, opening and closing information of the opening and closing sheet 25 and state change information of the baffle 27. The controller 5 can read the information recorded in the memory, thus providing users with functions such as historical query.

The baffle 27 can be designed as an arc structure, which can adapt to the contour of the human face. The first buckle 28 is a fishhook structure. The side of the baffle 27 can be embedded into the first buckle 28, so as to realize the vertical fixation of the baffle 27. The second buckle 29 is a gap structure between two plates. When the baffle 27 rotates to the horizontal state, the edge can be clamped into the gap of the plate, and the third press button 31 is provided in the gap. When the side of the baffle 27 enters the gap, the third press button 31 can be triggered.

The air outlet 30 of the external contact surface 3 is provided with a rotating air vent, and the air outlet 30 of the human face contact surface 2 is provided with filter cotton. Under normal circumstances, the rotating air vent is closed. When the baffle 27 becomes the horizontal state, the rotating air vent can be rotated, so that the air outlet 30 is communicated with the rotating air vent, thus realizing the air circulation in the top half part. The structure of the rotating air vent is similar to that of the traditional toothpick holder. A rotary cap with an opening is coated externally, and a corresponding hole is provided internally. When the screw cap rotates so that the opening corresponds to the hole, air circulation can be realized.

Preferably, the edge of the human face contact surface 2 is provided with a silicone strip 32.

The silicone strip 32 is provided, which can achieve a buffering effect and prevent the edge of the mask from pressing the face.

Preferably, the multifunctional protective isolation mask further comprises an elastic fixing belt 33, and both ends and the upper end of the elastic fixing belt 33 are connected with both sides and the upper part of the mask main body 1, respectively.

The mask main body 1 can be worn on the head of the user by the elastic fixing belt 33.

Preferably, the multifunctional protective isolation mask further comprises a rechargeable battery 34 and a charging interface 35, wherein the rechargeable battery 34 is provided inside the mask main body 1 and is electrically connected with the controller 5, the display screen 6 and the temperature sensor 4, respectively, and the charging interface 35 is provided above the mask main body 1 and is electrically connected with the rechargeable battery 34.

The rechargeable battery 34 is provided, which can supply power to an electrical device such as the controller 5. The charging interface 35 is provided, which can supply power through an external mobile power supply, and can also charge the rechargeable battery 34. The charging interface 35 also has the function of information transmission.

Preferably, the multifunctional protective isolation mask further comprises a key panel 36, wherein the key panel 36 is provided on the external contact surface 3 and is electrically connected with the controller 5.

The key panel 36 can provide functions such as query, history retrieval or timing test. After the key panel 36 sends a signal to the controller 5, the controller 5 reads the corresponding data and displays the corresponding data on the display screen 6.

Specifically, a horn and a pickup are further provided inside the mask main body 1 of the present disclosure. The horn is provided on the external contact surface 3, and the pickup is provided on the human face contact surface 2, so that the voice of the user can be amplified through the horn, which is convenient for the user to be communicated with doctors. At the same time, a tuning knob can be further provided to adjust the volume of the horn.

The external contact surface 3 can be further provided with an adjustable LED lamp and a camera. Both the adjustable LED lamp and the camera are electrically connected with the rechargeable battery 34 to provide the night lighting function and the video recording function. Meanwhile, a music player can be further provided on the external contact surface 3 to provide the music playing function. The mask can be identified by providing an identification plate on the external contact surface 3 to prevent others from taking the mask by mistake and prevent cross infection.

Both sides of the mask main body 1 can be provided with penetrating spectacle leg fixing holes 37. The spectacle leg fixing holes 37 are located on both sides and are communicated with the human face contact surface 2 and the external contact surface 3 for users wearing glasses. The spectacle leg fixing holes 37 are provided with opening sealing silicone sheets. The opening sealing silicone sheets can cover on the spectacle frame in a sealing manner after the spectacle frame passes therethrough, or an upward inclined bracket 38 is provided on the side of the mask main body 1. In this way, after the bracket 38 and the mask main body 1 form an opening with a larger upper part and a smaller lower part, different sizes of spectacle frames can be well fixed on the bracket 38, and the bracket 38 is rotatably provided at the side of the mask main body 1 and can be buckled on the mask main body 1.

The above is only a preferred embodiment of the present disclosure, and it is not intended to limit the present disclosure. Any modification, equivalent replacement, improvement, etc. made within the spirit and principle of the present disclosure shall be included in the scope of protection of the present disclosure.

What is claimed is:

1. A multifunctional protective isolation mask, comprising: a mask main body, a window channel, and a wearing monitoring mechanism, wherein the mask main body comprises a human face contact surface and an external contact surface, the wearing monitoring mechanism is provided on the mask main body; the wearing monitoring mechanism comprises a temperature sensor, a controller, a display screen and a first press button, the temperature sensor and the first press button are provided on an inside of the mask main body and are close to the human face contact surface, the first press button is located at an edge of the mask main body, the display screen is provided on an outer surface of the external contact surface; the external contact surface is provided with an oxygen pipe connection port, and the oxygen pipe connection port is communicated with the inside of the mask main body; the controller is provided inside the mask main body and is electrically connected with the display screen, the temperature sensor and the first press button, respectively;

wherein the window channel is communicated with the human face contact surface and the external contact surface, an opening and closing sheet is provided at a part where the window channel is communicated with the external contact surface, the opening and closing sheet opens and closes the window channel, the opening and closing sheet is provided with a second press button, and the controller is electrically connected with the second press button;

wherein the human face contact surface is provided with a baffle, a first buckle, a second buckle, an air outlet and a third press button, the third press button is provided in the second buckle, the baffle is located above the window channel and is hinged with the human face contact surface, the baffle is fixed by the first buckle when the baffle is in a vertical state and is fixed by the second buckle when the baffle is in a horizontal state, the controller is electrically connected with the third press button: the air outlet is communicated with the external contact surface, and the external contact surface is provided with a rotating air vent.

2. The multifunctional protective isolation mask according to claim 1, wherein the mask main body further comprises air inlet channels, an air outlet channel and motors, the air inlet channels and the air outlet channel are communicated with the external contact surface and the human face contact surface, and the motors are respectively disposed in the air inlet channels and the air outlet channel and are electrically connected with the controller.

3. The multifunctional protective isolation mask according to claim 2, wherein the mask main body further comprises filter assemblies, and the filter assemblies are respectively detachably inlet channels provided on the air inlet channels and the air outlet channel.

4. The multifunctional protective isolation mask according to claim 3, wherein the filter assemblies comprise connecting pipes, filter cotton sheets, pipe bodies, and perforated plates, and the filter assemblies disposed at the air inlet channels further comprise air regulating plates;

wherein the air regulating plates are provided at the air inlet channels of the human face contact surface, the connecting pipes are respectively connected at the air inlet channels and the air outlet channel of the external contact surface, an outer surface of each of the connecting pipes is provided with external threads, an inner surface of a first end of each of the pipe bodies is provided with internal threads, a second end of each of the pipe bodies is provided with a corresponding one of the perforated plates, each of the filter cotton sheets is provided at a corresponding one of the connecting pipes, and each of the pipe bodies is screwed with a corresponding one of the connecting pipes to fix an edge of a corresponding one of the filter cotton sheets.

5. The multifunctional protective isolation mask according to claim 2, further comprising an air quality sensor, a positioning chip, a sim slot and a rotation speed sensor for detecting a rotation speed of each of the motors, wherein the air quality sensor and the sim slot are provided on the human face contact surface, the positioning chip is provided inside the mask main body, and the controller is electrically connected with the air quality sensor, the rotation speed sensor, the positioning chip and the sim slot, respectively.

6. The multifunctional protective isolation mask according to claim 1, further comprising a pickup, a horn, an adjustable LED lamp and a camera, wherein the pickup is provided on the human face contact surface, the horn, the adjustable LED lamp and the camera are provided on the external contact surface, and the controller is electrically connected with the pickup, the horn, the adjustable LED lamp and the camera, respectively.

7. The multifunctional protective isolation mask according to claim 1, further comprising an information transmission unit, wherein the information transmission unit is provided inside the mask main body and is electrically connected with the controller.

8. The multifunctional protective isolation mask according to claim 1, further comprising spectacle frames and spectacle leg fixing holes, wherein the spectacle frames are provided on both sides of the mask main body, and the spectacle leg fixing holes are provided inside both sides of the mask main body and are communicated with the human face contact surface and the external contact surface.

\* \* \* \* \*